United States Patent [19]

Pertramer

[11] Patent Number: 5,050,864
[45] Date of Patent: Sep. 24, 1991

[54] SPORTING AND EXERCISE APPARATUS

[76] Inventor: Oswald Pertramer, Kravoglstr. 6, I-39020 Marling, Italy

[21] Appl. No.: 467,494

[22] Filed: Jan. 19, 1990

[30] Foreign Application Priority Data

Jan. 20, 1989 [DE] Fed. Rep. of Germany ........ 3901642
Oct. 5, 1989 [DE] Fed. Rep. of Germany ........ 3933280

[51] Int. Cl.$^5$ ............................................. A63B 69/16
[52] U.S. Cl. ........................................ 272/73; 280/245
[58] Field of Search ................. 272/33 R, 73, 70, 72; 280/232, 245, 246

[56] References Cited

U.S. PATENT DOCUMENTS

| | | | |
|---|---|---|---|
| 1,276,168 | 8/1918 | Buchholz | 280/245 |
| 1,598,788 | 9/1926 | Sinderson | 280/245 |
| 2,085,657 | 6/1937 | Heisdorf | 280/245 |
| 4,509,742 | 4/1985 | Cones | 272/73 |
| 4,712,790 | 12/1987 | Szymski | 272/73 |
| 4,757,988 | 7/1988 | Szymski | 272/73 |
| 4,828,284 | 5/1988 | Sandgren | 272/33 B |
| 4,871,164 | 10/1989 | Tseng | 272/73 |
| 4,880,225 | 11/1989 | Lucas et al. | 272/73 |

FOREIGN PATENT DOCUMENTS

| | | |
|---|---|---|
| 2742719 | 4/1978 | Fed. Rep. of Germany ........ 272/73 |
| 3325577 | 7/1983 | Fed. Rep. of Germany . |
| 626410 | 9/1927 | France . |
| 40060 | 7/1963 | German Democratic Rep. . |
| 103145 | 7/1923 | Switzerland . |

Primary Examiner—Robert Bahr
Attorney, Agent, or Firm—Davis, Bujold & Streck

[57] ABSTRACT

The invention concerns a sporting and exercise apparatus movable by muscular force consisting of a frame having for the user an elongated platform supported by at least two wheels and of a mechanical hand-lever drive for converting a lever motion into a rotary motion of at least one of the wheels. The lever drive has at least one hand lever hinged on the frame which actuates either two racks, at least one gear segment or a chain/-segment drive which act upon gears supported on a driving axle so that the racks, segment or the chain, when the lever is moved in one direction, actuate one gear to rotate clockwise and another gear counterclockwise, each gear being supported on the driving axle via a free-wheel unit.

2 Claims, 4 Drawing Sheets

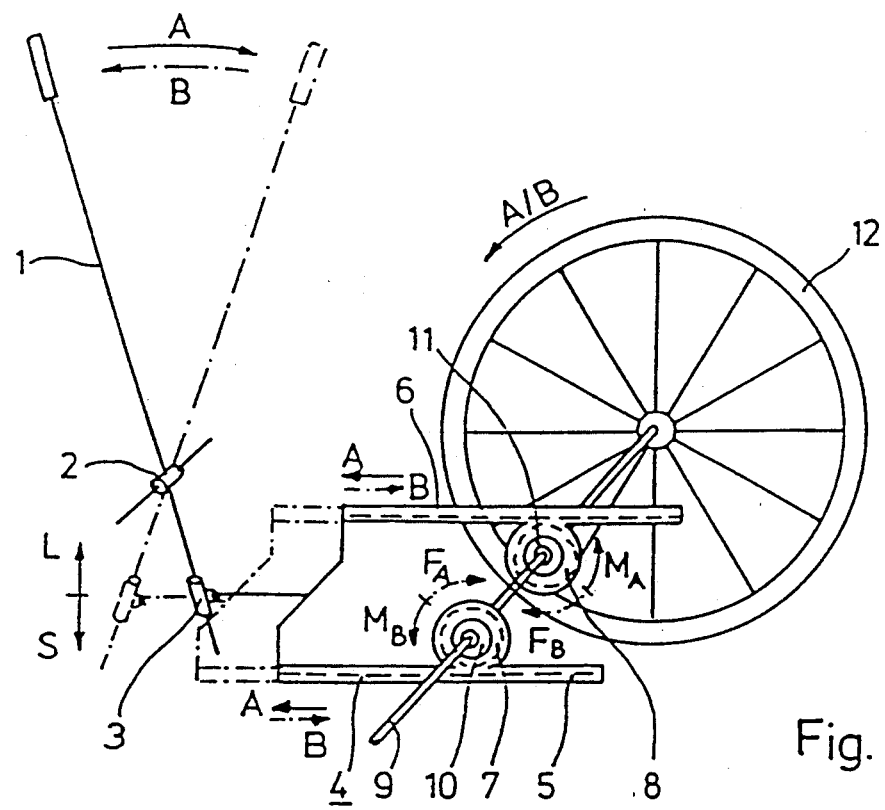
Fig. 1
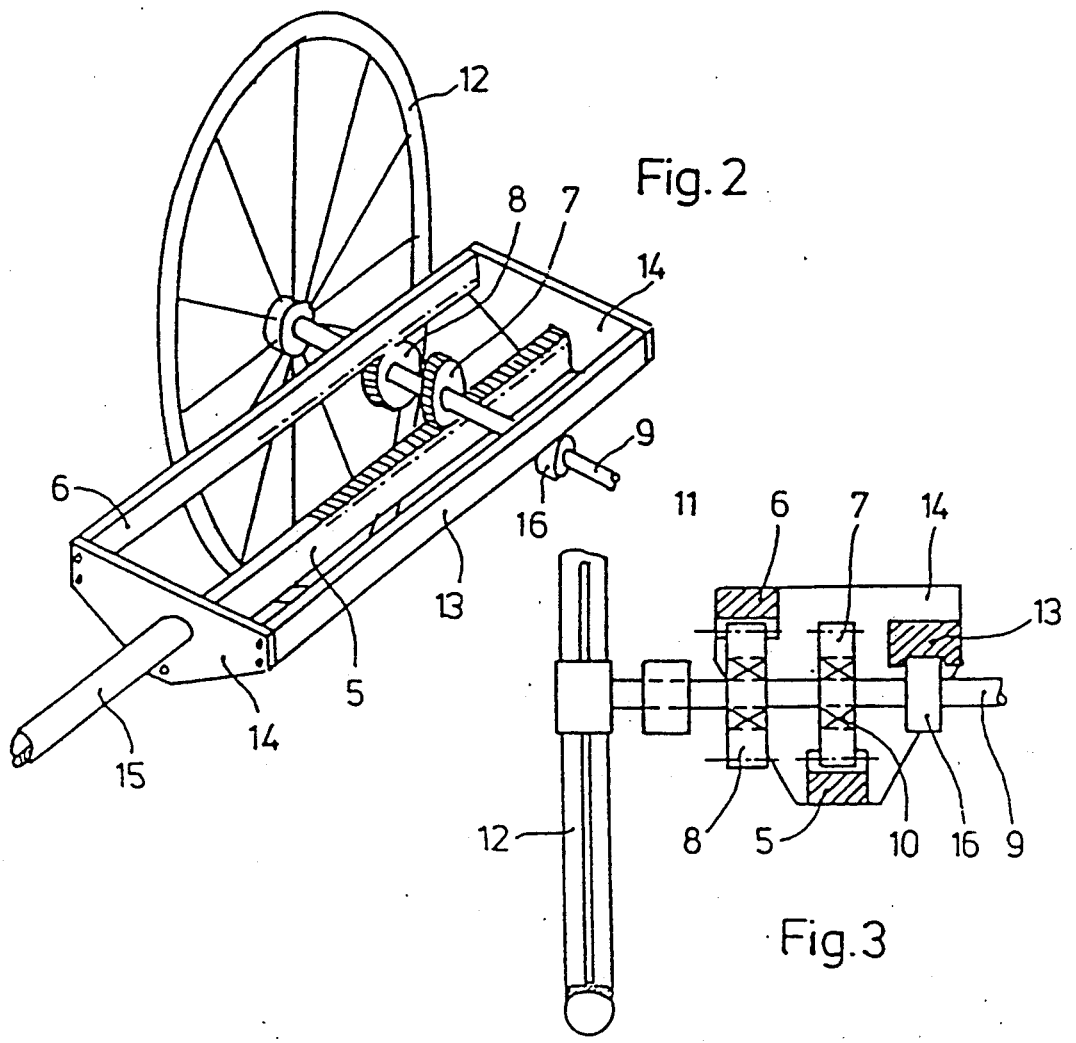
Fig. 2
Fig. 3

SPORTING AND EXERCISE APPARATUS

The invention relates to a sporting and exercise apparatus movable by muscular force and including a frame having for the user an elongated platform, being supported on the ground by at least two wheels and having a mechanical hand-lever drive for converting a lever motion into a rotary motion of at least one of the wheels.

Already known are so-called scooters, specially for children, having a frame including an elongated platform which usually is supported on the ground by two wheels and a hand lever which is pivoted at the forward end of the platform, extends essentially upwardly to a horizontal guide bar with the lower end of the hand lever being connected with the front one of the wheels. The forward motion is achieved by muscular force, one foot of the user being on the platform and the other foot carrying out a continuous pushing movement on the ground. For steering purposes, the guide bar is pivoted about its longitudinal axis whereby the front wheel undergoes a corresponding steering angle change. The steering movement is supported by an inclination of the user to the side corresponding to the steering angle. Such a scooter is a relatively one-sided sporting apparatus, since here only one leg is constantly required while the other leg, the upper part of the body and the arms are hardly moved.

The problem to be solved by the invention is to provide a sporting and exercise apparatus which a user in upright position can move forward and in which, instead of the legs, the whole body, mainly the whole trunk muscles, but also the arm and leg muscles are used to produce the driving force.

The upright position is preferred, since it makes breathing easier compared to sitting on a bicycle.

Another problem to be solved by the invention is that of providing an apparatus that is both driven and steered by a harmonious movement of the whole body, thus improving the coordination of the movements of the body.

This is obtained by hand levers which drive in forward and backward movement, incline the platform on sidewise inclination and produce, by a steering mechanism, a steering angle proportional to the inclination of the lever.

Still another problem solved by the invention is that of converting into a propulsion of the apparatus, minimal forward and backward movements of the levers independently of each other with the least possible play while providing a constant transmission ratio over the whole path of the lever and the possibility of stopping at any point of the movement one or both levers without causing a braking of the apparatus.

Yet another problem solved is to provide a design of the drive that permits a separate control of the transmission ratio on both levers useful, for instance, for the rehabilitation of weakened muscles.

The invention will now be described in more detail, by way of example, with reference to the drawings, in which:

FIG. 1 is a diagrammatic view of a first embodiment of a hand-lever drive;

FIG. 2 is a rack-and-pinion drive for one axle half of the hand-lever drive shown in FIG. 1;

FIG. 3 is a cross-section through the rack-and-pinion drive of FIG. 2;

Figure 4:
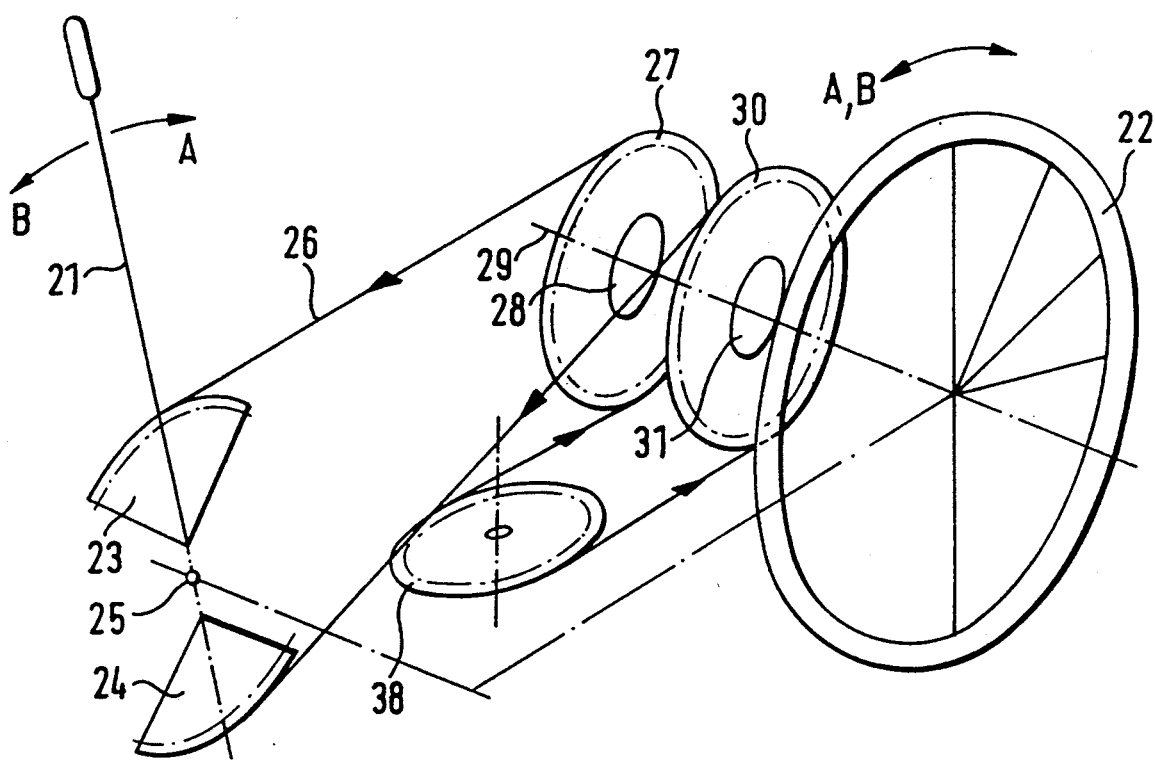
FIG. 4 is a diagrammatic view of a second embodiment of a hand-lever drive.

FIG. 1 shows a mechanical hand-lever drive having a hand lever 1 pivotally supported on a pin having a rotation axis 2 of the frame, there being provided a pivotal point 3 to which is connected a drive element 4 consisting of two racks 5, 6. Each rack is meshed with a gear 7, 8 which is connected with a drive axle 9 via a free-wheel unit 10, 11. Said free-wheel units 10, 11 provide locking in counterclockwise rotation and free wheeling in clockwise rotation of the connection between the gears 7, 8 and the axle 9 (as seen in FIG. 1). One rack 6 is situated above and the other rack 5 below the corresponding gear 7, 8 in order to effect movement, in counterclockwise direction (as seen in FIG. 1), of a track wheel 12 firmly connected with the axle 9 as the lever is moved to the rear and to the front.

A designates the direction of movement of the racks each time the hand lever is drawn to the back and B designates the direction of movement of the racks when the hand lever is pressed forward. $M_A$ and $M_B$ indicate here the locking in the direction A or B and $F_A$ and $F_B$ mean the free wheeling in the direction A or B.

To adjust the leverage or the consumption of energy in this embodiment, the pivotal point 3 at the lower end of the lever can be moved either toward the rotation axis 2 for a low speed L or a small consumption of energy or away from the rotation axis 2 for a higher speed S or a greater consumption of energy. It is also possible to move the pivotal axis 2 (sic) along the longitudinal axis of the hand lever 1 in addition or instead of moving pivot point 3.

In FIG. 2 and 3 is shown a variant of the hand-lever drive shown in FIG. 1 in which both racks 5, 6 are firmly connected each by means of their forward and rear ends by one plate 14 which also support an added guide rail 13. On the forward plate is mounted a push-/pull rod 15 that leads to the pivotal point 3. The guide rail 13 guides a ball bearing 16 mounted on the axle 9 and with the former prevents the racks 5, 6 from tilting sideways.

Figure 5:
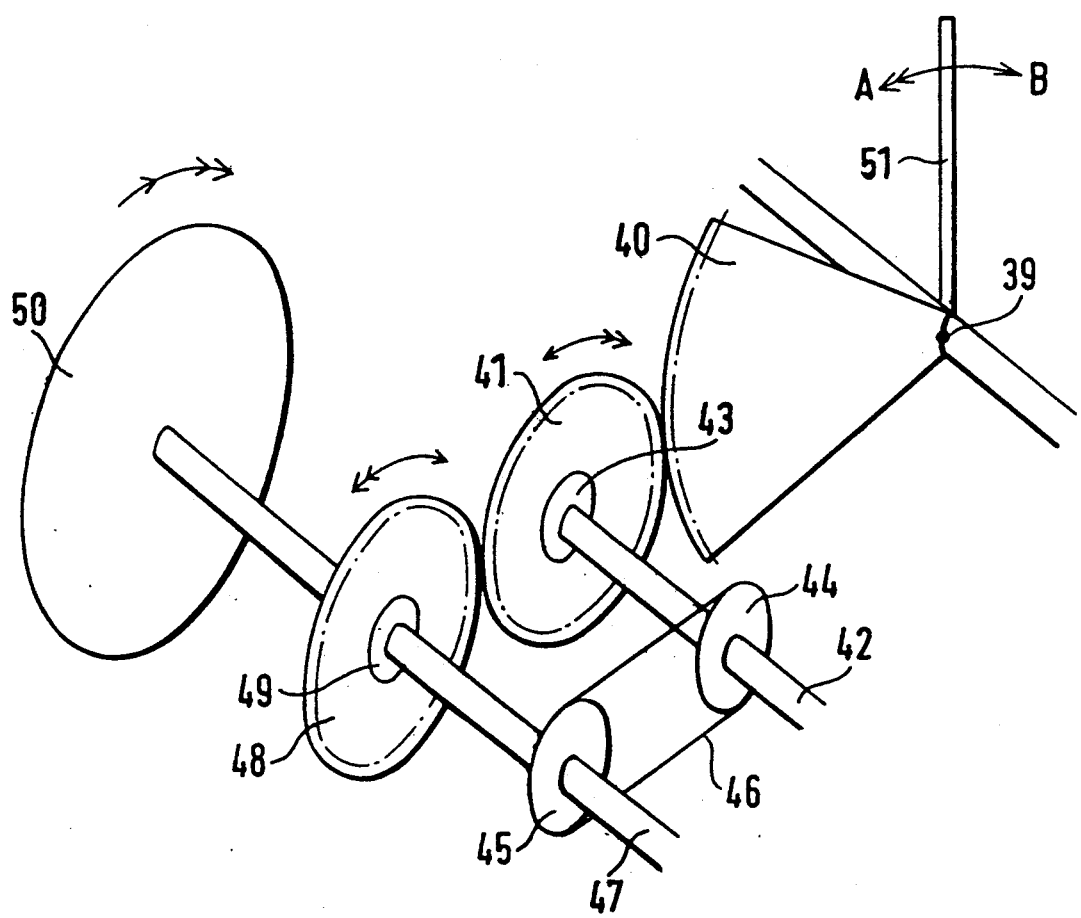
FIG. 5 is a diagrammatic view of a third embodiment of a hand-lever drive.

Such a hand-lever drive is adequate not only for a sporting and exercise apparatus, as shown in FIG. 5, but also for driving a wheel-chair; in the traditional drive of wheel-chairs there are used hand levers which act upon a crank of the drive axle via a rod. There is provided for each hand a hand lever which acts upon staggered cranks of the drive axle. At the same time both hand levers are only actuated in one direction, with the backstroke free via a free-wheel unit so that only half of the reciprocating movement is converted into a forward movement.

A use of a hand-lever drive shown in FIG. 1 to 3 associated with a wheel-chair brings the advantage that a lever drive also takes place in reciprocating movements independently of the position of the lever.

FIG. 4 shows a second embodiment of a hand-lever drive according to the invention for converting a lever motion into a rotary motion.

In said figure, 21 designates a hand lever supported on a rotation axis 25 in the frame. On both sides of the rotation axis 25 the hand lever 21 is provided with opposed, symmetrically arranged wheel segments 23, 24 pivotable with the hand lever 21 about axis 25. Seen in travel direction, behind the hand lever 21 and below the platform (not shown in FIG. 4) is provided a shaft 29 on which two gears 27, 30 are supported each via a free-wheel unit 28, 31, said free-wheel units 28, 31 operating, the same as in the first embodiment, a counterclockwise rotating drive or a clockwise rotating free wheel (as seen in FIG. 4) connected between the gears 27, 30 and the shaft 29. For this purpose both wheel segments 23, 24 are connected by means of a chain 26 the two ends of which are secured to the respective front ends of the wheel segments 23, 24. Departing from the upper toothed segment 23, the chain 26 engages first the gear 27, then passes over a guide roller 38, freely rotatable in both directions and secured to the frame, and then engages the second gear 30 before extending to the lower wheel segment 24. The direction in which the gears 27, 30 are engaged is selected is opposite one another so that pushing lever 21 in direction B drives, the wheel 22 is fixed on shaft 29 by way of gear 27 and pulling lever 21 in direction A drives that wheel 22 by way of gear 30, the direction of wheel drive being clockwise (as seen in FIG. 4).

Instead of a wheel 22, it is also possible to provide a drive wheel for driving a wheel-chair, for instance. But if the hand-lever drive shown in FIG. 4 serves to drive the sporting and exercise apparatus shown in FIG. 6, then the wheel 22 can be directly connected by means of an endless chain with the drive wheel 33 (FIG. 6) or be connected with a gear provided between the shaft 29 and the drive wheel 33, which gear is connected via another endless chain with the axle of the rear drive wheel 33. Depending on the selected diameter of the gears, this allows a graduation of the transmission ratios. The drive wheel 33 can be advantageously provided with a multiple hub control actuated by a Bowden wire (not shown) which traverses the underside of the frame and extends upwardly on the hand lever 21 or 21'. In addition the sporting and exercise apparatus of FIG. 6 is provided with a hand brake likewise not shown which is also secured to the upper end of one of the hand levers 21, 21'.

Figure 6:
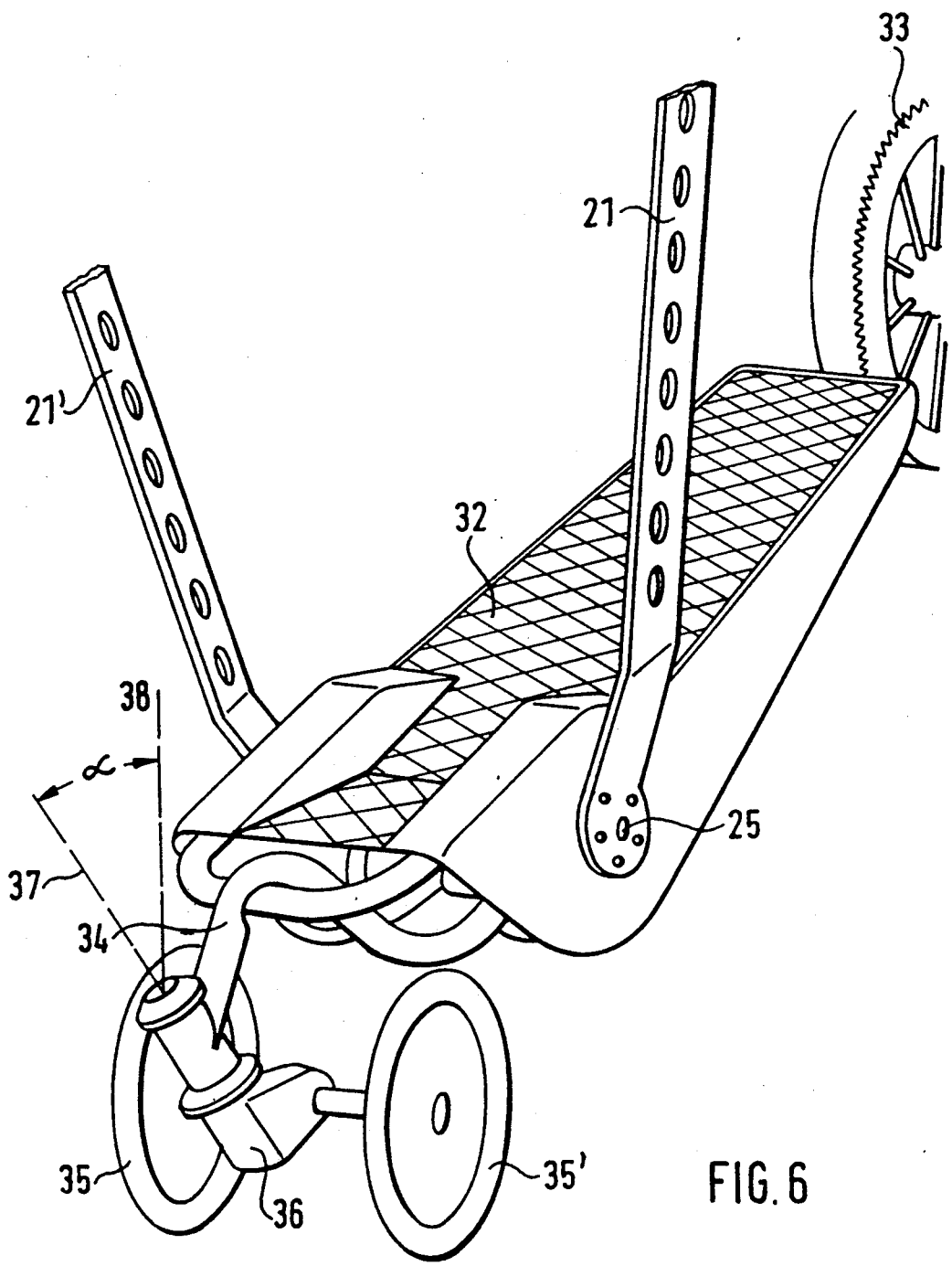
FIG. 6 is a perspective view of a sporting and exercise apparatus according to the invention.

In FIG. 6 is in addition designated with 32 the platform that carries the user. Instead of a single hand lever (according to FIG. 1) there are provided here two hand levers 21, 21' which are secured to the frame on the axis of rotation 25. Each hand lever is provided with a lever drive as shown in FIG. 4, that is, with two toothed segments, and a chain drive with two gears having free-wheel units and a guide roller. This means that both hand levers 21, 21' are movable either simultaneously in the same direction or opposite to one another. It is further also possible to provide on the shaft 29 two separate wheels 22, each one being actuatable by only one of the two hand levers 21, 21'.

Two front wheels 35, 35' situated parallel with each other together with the drive wheel 33 support the frame on the ground. The front wheels 35, 35' are free-rotatably supported on a connecting axle and connected with the frame via a guide 36, the guiding pivot axis 37 for the axle of which forms with the vertical, a castor angle α specifically in a vertical plane in which lies the longitudinal axis of the frame. The angle α can be altered in a specially preferred embodiment by an adjustment of the guide 36. Said angle α is advantageously on the order of from 5° to 50°. Here sideways inclination of the levers 21, 21' and the frame produce a desired steering action about axis 37.

In FIG. 5 is shown a third embodiment of a hand-lever drive according in the invention such as for the sporting and exercise apparatus shown in FIG. 6.

Here, hand lever 51 which is pivotable, about an axis transverse of the apparatus, in both directions, at rotation axis 39. Attached to the lower end of the hand leve 51 is a toothed segment 40 which lies in the longitudinal vertical plane of the apparatus and whose toothed outer edge meshes with a gear 41 secured via a free-wheel unit 43 to an intermediate shaft 42. The gear 41 meshes with a second gear 48 which is connected via a free-wheel unit 49 with a second shaft 47 upon which is secured the drive wheel 50 for driving the sporting and exercise apparatus. Parallel with the two gears 41, 48 are two other gears 44, 45 fixedly mounted on the respective shaft 42 or 47 and interconnected via an endless chain 46.

In this embodiment, the drive pinion 50 on the shaft 47 be driven in the same direction, as indicated by the single arrow or double arrow with both the forward motion B and the backward motion A of the hand lever 1. In a backward motion A, the toothed segment 40 is lowered and thus drives the gear 41 in direction of the double arrow. The gear 41 meshes with the second gear 48 which is driven in opposite direction. Since this direction of rotation is opposite to the desired direction of rotation of the pinion 50, the gear 48 in this motion runs over the free-wheel unit 49 without applying torque to the shaft 47 whereas the rotation motion originating from the toothed segment and transmitted to the gear 41 is transmitted to the shaft 47 and by the two gears 44, 45 that are firmly connected with their shafts and the endless chain 46, and thus serves to drive the wheel 50 in direction of the double arrow. With movement of the hand lever 1 in direction B, the toothed segment 40 is lifted and drives the gear 41 in direction of the single arrow with the gear 48 then being driven in the opposite direction, the free-wheel unit 49 of the gear 48 being now disengaged and the torque being directly transmitted to the pinion 50 via the drive 40, 41, 48. The free-wheel unit 43 of the gear 41 is operative in this direction of rotation so that the shaft 42 can rotate in opposite direction to the gear 41 by virtue of the gears 44, 45 and the chain drive 46.

I claim:

1. A sporting and trimming apparatus movable by muscular power consisting of an undercarriage with an elongated area for a user and supported on the ground by at least two wheels and a hand-lever drive for converting lever motion into rotary motion of at least one of said wheels, wherein the hand-lever drive is mounted on a pivot point in the undercarriage and has a hinge on which is articulated a drive element comprising two racks which act upon a respective gear lodged in a drive axle in a manner such that, when the direction of movement is the same, said racks actuate to the right and to the left the corresponding gear and wherein each time only one gear causes the drive axle to rotate along with it via associated free wheels while the other gear spins freely in an opposite direction, characterized in that the position of said racks (5,6) upon said gears (7,8) is defined by an additional guide rail (13), said guide rail (13) being firmly connected with racks (5,6) and sliding upon a ball bearing (16) which is mounted upon said drive axle (9) and embraces it on both sides for laterally guiding said drive element (4).

2. An apparatus according to claim 1, characterized in that said hinge (3) is vertically movable disposed on said hand lever (1) for adjusting the transmission ratio.

* * * * *